C. BEARENS.
TRANSMISSION GEAR.
APPLICATION FILED MAY 8, 1920.
1,379,512.
Patented May 24, 1921.
3 SHEETS—SHEET 1.
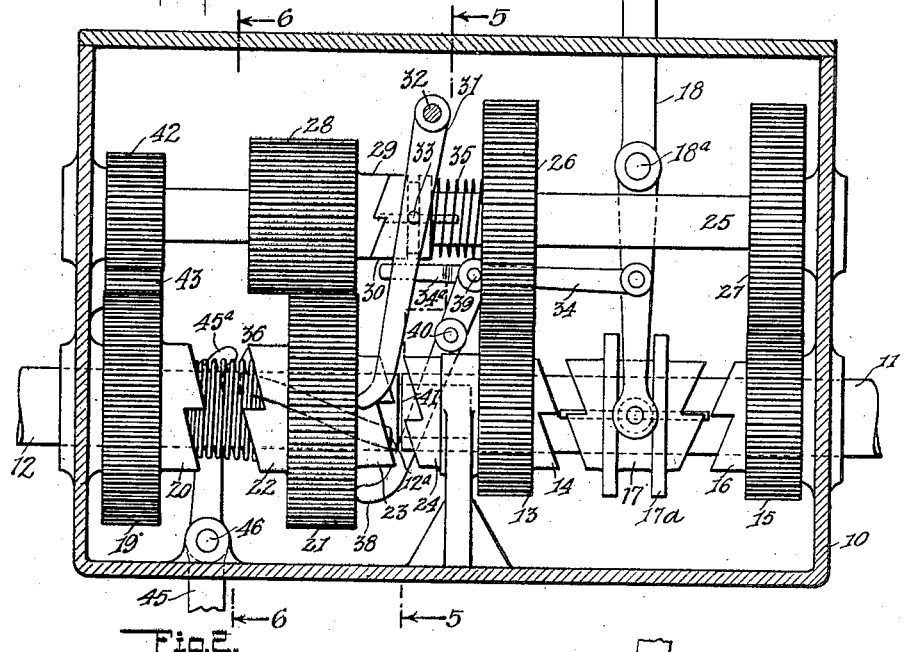
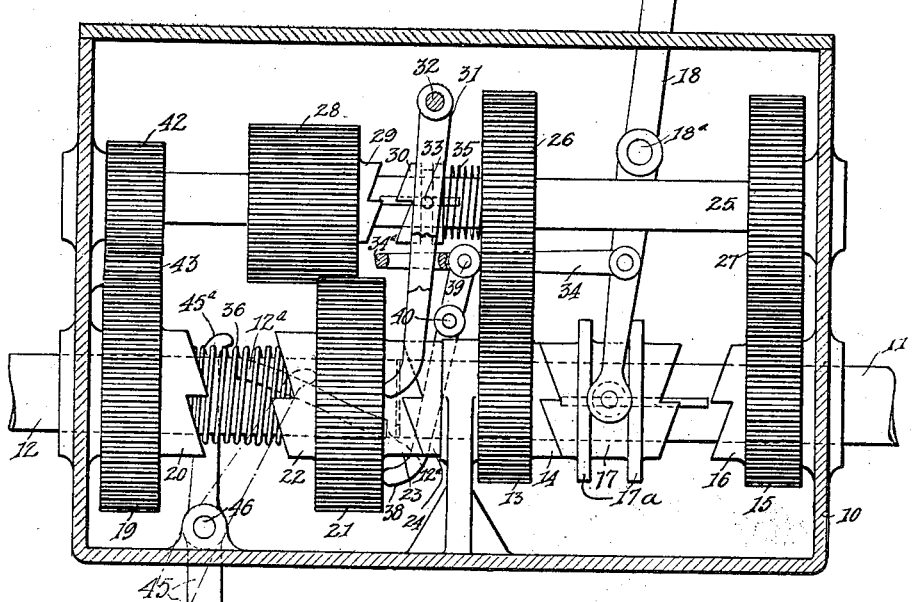
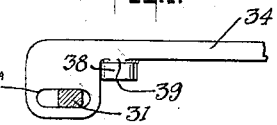
WITNESSES
Frederick Diehl.
INVENTOR
CLAUDE BEARENS
BY
ATTORNEYS WITNESSES
Frederick Diehl.

INVENTOR
CLAUDE BEARENS
BY
ATTORNEYS

C. BEARENS.
TRANSMISSION GEAR.
APPLICATION FILED MAY 8, 1920.

1,379,512.

Patented May 24, 1921.
3 SHEETS—SHEET 3.

WITNESSES

INVENTOR
CLAUDE BEARENS
BY
ATTORNEYS

UNITED STATES PATENT OFFICE.

CLAUDE BEARENS, OF NEW YORK, N. Y.

TRANSMISSION-GEAR.

1,379,512. Specification of Letters Patent. Patented May 24, 1921.

Application filed May 8, 1920. Serial No. 379,848.

*To all whom it may concern:*

Be it known that I, CLAUDE BEARENS, a citizen of the United States, and a resident of the city of New York, borough of Manhattan, in the county and State of New York, have invented a new and Improved Transmission-Gear, of which the following is a description.

The general object of my invention is to provide in a transmission gear means to effect an automatic gear shift, whereby if in starting or going up hill or otherwise running under heavy load under direct drive and high speed, should the speed be too high for starting or overcoming the resistance without shock, the gearing will be automatically thrown out of high gear and into a lower gear to start or continue under the latter.

The nature of the invention as well as its advantages will be clear from the specific description following:

Reference is to be had to the accompanying drawings forming a part of this specification, it being understood that the drawings are merely illustrative of one example of the invention.

Figure 1 is a side elevation of a transmission gear embodying my invention, the casing being in section, said view showing the gearing in neutral position;

Fig. 2 is a view similar to Fig. 1 but showing the gearing in high speed direct drive;

Fig. 7 is a side view showing a portion of a novel element associated with the clutch lever and to be hereinafter referred to.

Figure 3:
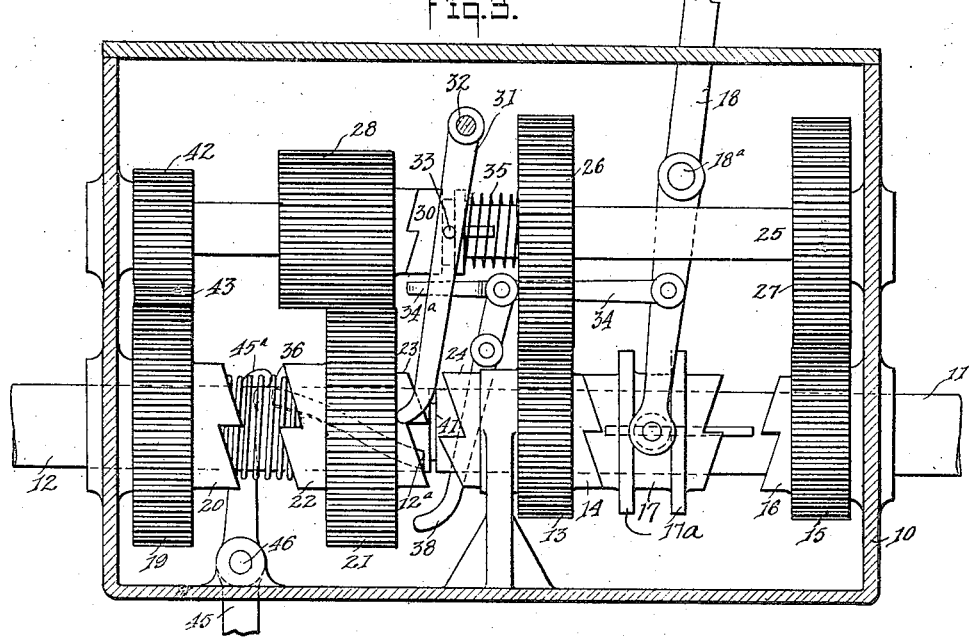
Fig. 3 is a view similar to Fig. 2 but showing the gearing after the automatic shift gear has moved from the position of high speed direct drive to a low gear position.

In carrying out my invention in accordance with the illustrated example, a suitable casing and supporting structure indicated by the numeral 10 is provided, affording bearings for a drive shaft 11 and a driven shaft 12 in alinement therewith. Loose on the shaft 11 is a gear wheel 13 having rigid therewith a clutch element 14 and also loose on said drive shaft is a second gear element 15 having rigid therewith a clutch element 16. Between the loose elements 13 and 15 a movable clutch 17 is provided, presenting at its opposite ends clutch elements toward the two clutch elements 14 and 16, and having collars 17$^a$ between which is disposed the end of the clutch lever 18 fulcrumed as at 18$^a$.

On the driven shaft 12 is a loose reversing gear element 19 to be hereinafter referred to having rigid therewith a clutch element 20. On the driven shaft also is a gear element 21 which constitutes the automatic shift element of my gearing. Engagement is effected between the automatic gear element 21 and the driven shaft 12 through the medium of a spiral rib on the one and a corresponding spiral groove in the other, there being shown a spiral rib 12$^a$ on shaft 12 which is accommodated in a corresponding spiral groove in the hub of the gear element 21, the arrangement being such that said element 21 may have a turning and sliding movement on the shaft 12 to the extent determined by the engagement with said rib 12$^a$. Rigid with the shift gear element 21 is a clutch element 23 adapted to engage a corresponding element 24 rigid with the drive shaft 11 for direct high speed drive of shaft 12 and a rigid clutch element 22 at the opposite side to engage clutch element 20 of gear element 19 for reverse drive of shaft 12.

A counter-shaft 25 has a fixed gear 26 thereon constantly in mesh with the gear element 13 and has also a fixed gear element 27 thereon in constant mesh with the gear element 15. A third broader gear element 28 is loose on the shaft 25 and has rigid therewith a clutch element 29 adapted to be engaged by a sliding clutch element 30 on shaft 25. The clutch 30 is subject to movement by a clutch lever 31 fulcrumed at one end as to a transverse shaft or rod 32 and engaging between its ends as at 33 with said clutch element 30. The free end of clutch lever 31 is directed laterally and lies adjacent to the automatic shift gear element 21 at that side disposed toward the clutch element 24. A link 34 is pivoted at one end to clutch lever 18 between its fulcrum 18$^a$ and the clutch 17, said link having an offset slotted head 34$^a$, through which the clutch lever 31 extends. The slot of head 34$^a$ permits a certain movement of the link 34 without affecting the clutch lever 31 as will appear. A comparatively light spring 35 is coiled about the shaft 25 between the gear element 26 and the clutch 30 tending to throw the latter into clutching position.

A spring 36 is coiled about the driven shaft 12 between the clutch elements 20, 22 and adapted to be housed by the latter in their clutched position being accommodated at its ends in a pocket 37 in the clutch element 20 and a corresponding pocket in the clutch element 22. Said spring 36 has a strength superior to that of the spring 35 and it normally tends to throw the automatic shift gear 21 with its clutch member 23 in engagement with the clutch member 24 of the drive shaft 11 so that said element 21 will be driven with the turning of shaft 11 and thereby will turn the driven shaft 12 through the engagement of said gear 21 with the spiral rib 12ª. A lever 38 is pivotally connected at one end with the link 34 and is fulcrumed between its ends as at 40, the free end of said lever 38 being deflected laterally and lying adjacent to the automatic shift gear element 21 at that face against which the clutch lever 31 bears.

With the described construction, the clutch lever 18 may throw the slidable clutch 17 to neutral position in Fig. 1 in which position the lever 38 will be caused to maintain the automatic shift gear 21 out of clutched engagement with the clutch element 24 of drive shaft 11 with the spring 36 under compression. To start under direct drive high speed the clutch lever will be thrown to the position shown in Fig. 2 thereby throwing the sliding clutch 17 into clutch with the loose gear 13. At the same time, however, the lever 38 will be withdrawn from exerting pressure against the shift gear 21 permitting the spring 36 to throw said gear 21 into clutched engagement with the driven clutch 24 on drive shaft 11. The withdrawal of the lever 38 from shift gear 21 and the movement of the latter under the action of the spring 36 will act through the clutch lever 31 to shift the sliding clutch 30 out of engagement with gear element 28, the tension of the spring 35 at this time yielding to the superior force of the spring 36. With the gears thus in the position of Fig. 2 the drive from shaft 11 will be through the clutch elements 24, 23, direct to the gear element 21 and thus to the driven shaft 12, the gears 26, 27, 28 and the shaft 25 turning freely, said latter gears being in mesh respectively with the gears 13, 15, and 21 but doing no work.

If with the high speed and direct drive, the peak of resistance of the spring 36 be reached either in overcoming too great an inertia in starting or in encountering undue resistance such as hill climbing, then the gear will be automatically thrown into low gear because the gear element 21 will shift spirally along the rib 12ª, thereby disengaging the clutch element 23 from the driven clutch element 24 as illustrated in Fig. 3, the clutch lever and the lever 38 controlled thereby remaining in their positions of high speed direct drive and with the slide clutch 17 in clutch with the loose gear 13. At the same time the shifting of the gear element 21 away from the clutch lever 31 permits the spring 35 to throw the clutch 30 into engagement with the clutch 29 of gear element 28 which is constantly in mesh with the shift gear element 21. With the gear positions of Fig. 3 the drive will be from the drive shaft 11, through the gear 13 to gear 26, to shaft 25, through gear 28 and through the gear element 21 to the driven shaft 12 for driving the latter at low speed.

I prefer to employ a core or alining shaft section 41 extending into the tubular adjacent ends of the drive shaft 11 and driven shaft 12.

Figure 4:
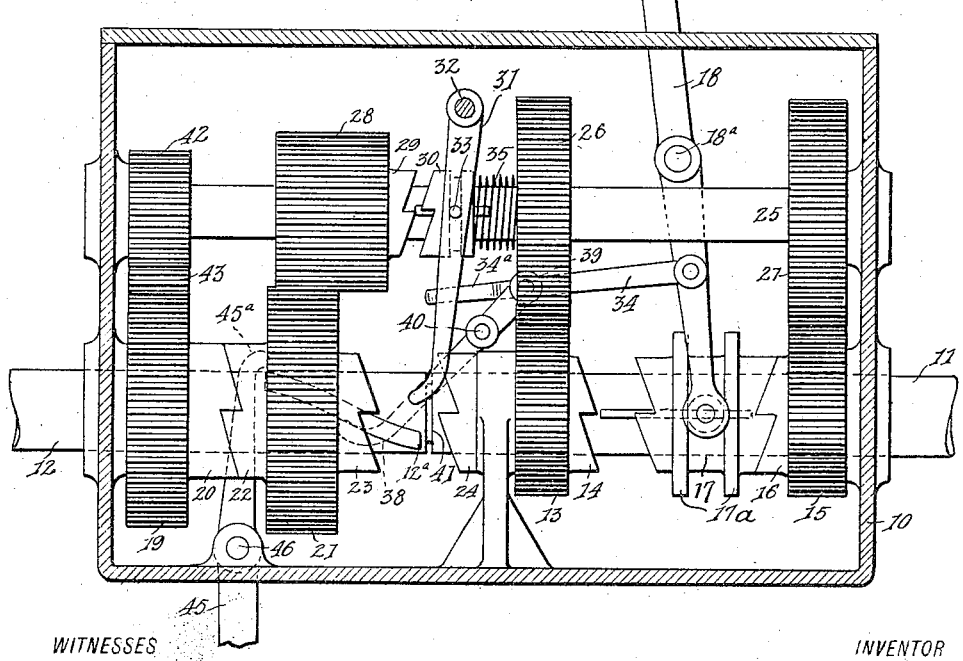
Fig. 4 is a similar view but showing the gearing disposed for reversing.
Figure 5:
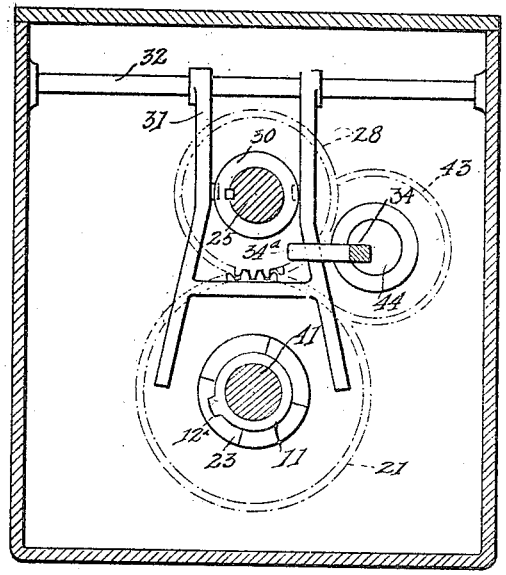
Fig. 5 is a transverse vertical section on the line 5—5, Fig. 1.
Figure 6:
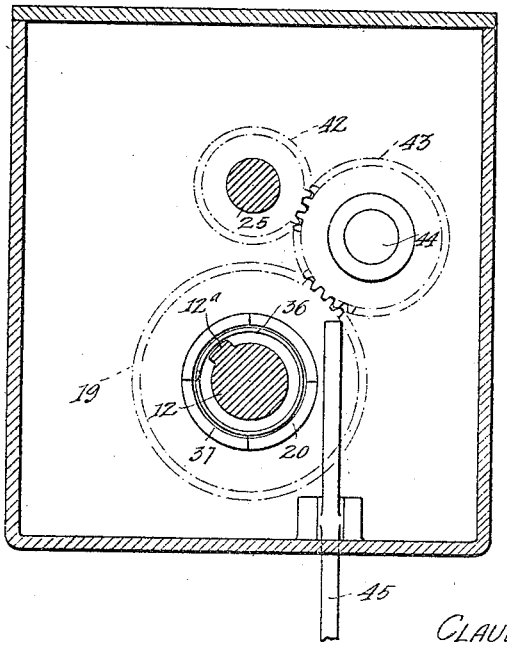
Fig. 6 is a transverse vertical section on the line 6—6, Fig. 1.

The reverse gear elements in my improved transmission gear are as follows: On the shaft 25 is a fixed gear element 42 which meshes with an intermediate gear element 43 on a shaft 44, said intermediate gear element in turn meshing with the loose gear element 19 on the driven shaft 12. In order to reverse, the clutch lever 18 is reversed to the position of Fig. 4 to throw the sliding clutch 17 out of engagement with the gear element 13 and into clutched engagement with the loose gear element 15, whereupon the drive will be from the element 15 to element 27 and shaft 25 and gear element 42, the gear elements 13, 26 and 28 at this time turning idly, that is to say, exerting no driving action. The throwing of the clutch lever to the position of Fig. 4 will cause the link 34 to rock the lever 38 and cause the latter to shift the gear element 21 into clutched engagement with the gear element 20 of the element 19. Said gear element 19 will be turned by the gear element 42 through the intermediate gear 43 and will in turn drive the element 21 and the driven shaft 12. With the lever 18 in the position for reverse drive as in Fig. 4, the spring 35 is prevented from throwing the clutch 30 into engagement with gear element 28 because the slotted head 34ª will have been brought into such a position as to prevent movement of the lever 31.

I provide means for optionally preventing the automatic functioning of the shift gear 21 should it be desired for any reason to hold said gear to its work, for which purpose in the illustrated example a manually operable lever 45 is fulcrumed as at 46 and extends at its free end 45ª in position to be moved against that face of the automatic shift gear element 21 adjacent to the spring 36 so that the lever 45 may be thrown to shift the gear element 21 into clutch with the gear element 24 and hold it in engagement for direct drive.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:—

1. Means to transmit the motion of a drive shaft to a driven shaft, said means comprising revoluble transmission elements adapted to function for direct high speed drive of the driven shaft or for a lower gear drive thereof and including an automatic shift gear adapted to be directly driven by the drive shaft and to directly drive the driven shaft, said shift gear being resistant of normal loads and subject to a critical resistance when in high gear position, said shift gear being yieldable to undue resistance to shift longitudinally out of direct drive position and subject to lower gear elements to automatically throw said transmission means into the lower gear.

2. A transmission means comprising elements adapted to establish direct high speed drive between a drive element and a driven element, together with auxiliary elements functioning for a lower gear drive and including an automatic shift gear wheel adapted to assume different positions for being directly driven, and directly driving the driven shaft and normally tending to maintain its high gear position subject to a critical load, said shift gear being yieldable to an undue resistance to automatically shift from high gear to lower gear position, said shift gear meshing constantly with a lower gear element, and means to actuate said lower gear element with the movement of the shift gear element from high speed drive position.

3. The combination with a drive and a driven element, of transmission means, and manually operable controlling means to throw the transmission means into or out of action, said first-mentioned means comprising elements adapted to function for direct high speed drive and auxiliary elements adapted to be brought into action for a lower gear drive, as well as including an automatic shift gear wheel constantly in mesh with a lower gear drive element and adapted to assume different positions for functioning in high gear drive and lower gear drive, said shift gear wheel normally tending to maintain a high gear position subject to a critical load, being yieldable to undue resistance to automatically shift from high gear to lower gear position under an excessive load.

4. The combination with a drive and a driven element; of transmission means, and manually operable controlling means to throw the transmission means into or out of action, said first-mentioned means comprising elements adapted to function in direct high speed drive and auxiliary elements adapted to be brought into action for a lower gear drive, as well as including an automatic shift gear adapted to assume different positions for functioning in high gear drive and lower gear drive, yieldable means tending to maintain said shift gear in high gear position, and means to give a turning and axial movement to said shifting gear from high gear position to lower gear position upon the resistance of said yieldable means being overcome by a load.

5. The combination with a drive shaft and a driven shaft, of a clutch element turning with said drive shaft, a gear element on said driven shaft presenting a clutch element adapted to engage the first-mentioned clutch element, a spiral rib on said driven shaft for the turning of said driven shaft by said gear element, and spring means normally tending to maintain said gear element in clutch with the first-mentioned clutch element, said spring being yieldable to an undue load to permit movement of the gear element along said rib.

6. The combination with a drive and a driven shaft, of a clutch element turning with the drive shaft, a gear element having engagement with the driven shaft to turn the latter and movable axially thereon toward or from said clutch element, said gear element presenting a clutch member to engage the first-mentioned clutch element, and a spring normally tending to maintain said gear element in clutch, said spring being yieldable to undue load to permit automatic movement of said gear element out of clutched position.

7. The combination with a drive and a driven shaft, of a clutch element turning with the drive shaft, a gear element having engagement with the driven shaft to turn the latter and movable axially thereon toward or from said clutch element, said gear element presenting a clutch member to engage the first-mentioned clutch element, and a spring normally tending to maintain said gear element in clutch, said spring being yieldable to undue load to permit automatic movement of said gear element out of clutched position; together with auxiliary gear elements through which motion of the drive shaft is transmitted to said first-mentioned gear element when the latter shifts away from the clutched position.

8. The combination with a drive shaft and a driven shaft, said drive shaft having a clutch element thereon to turn therewith; of a gear loose on the drive shaft and having a clutch element rigid therewith, a slidable clutch turning with the drive shaft and manually operable to engage the clutch element on said loose gear, a shift gear element on the driven shaft and slidable thereon into or out of engagement with the first-mentioned clutch element, spring means tending to throw said slidable gear element into engagement with said first-mentioned clutch element to be driven by the drive shaft, said spring means being yieldable to permit said shift gear element to shift from said clutched position under excessive resistance, an auxiliary shaft, a gear element on the auxiliary shaft in mesh with the loose gear on the drive shaft, a second gear element on the auxiliary shaft in constant mesh with said shift gear element, and means to throw the second-mentioned gear element of the auxiliary shaft into or out of clutch with the latter with the shifting of said shift gear element.

9. The combination with a drive shaft and a driven shaft, of a clutch element turning with the drive shaft, a low gear drive element loose on the drive shaft and presenting a clutch member, a reversing gear element on the drive shaft and presenting a clutch member, a clutch on the drive shaft movable into engagement with either of said loose gears, a reversing gear element on the driven shaft and presenting a clutching member, a second gear element on the driven shaft and movable longitudinally into engagement with the clutch element on the drive shaft, or into engagement with the clutch member of said reversing gear, spring means tending to maintain said slidable gear element in engagement with the clutch element on the drive shaft and yieldable to an undue load to permit the slidable gear to shift, an auxiliary shaft, means driven by the auxiliary shaft to actuate said reversing gear element, gear elements on the auxiliary shaft in mesh respectively with the loose gear elements on the drive shaft, a gear element loose on the auxiliary shaft and in mesh with the slidable gear element of the driven shaft, a clutch on the auxiliary shaft to engage said last-mentioned loose gear element thereon for turning the latter with the turning of the auxiliary shaft, a spring tending to throw the last-mentioned clutch into clutching position, said spring being inferior to the first-mentioned spring, means to throw the clutch on the auxiliary shaft out of engagement with that gear element on the auxiliary shaft engaging the slidable gear element of the driven shaft when said slidable gear element is moved into engagement with the clutch element turning with the drive shaft, and means to throw the slidable gear element into engagement with the reversing gear element on the driven shaft, when the clutch element on the drive shaft is shifted into engagement with the reversing gear element on the drive shaft; together with means to prevent the clutch on the auxiliary shaft from movement to clutching position when the reverse gears are in action.

10. A transmission gear comprising elements for driving in high gear, lower gear, or reverse, and including a shift gear functioning in all of said drive positions of the gearing, means to directly drive said shift gear, a spring normally tending to throw said shift gear into engagement with said drive means, said shift gear being automatically yieldable to undue resistance to permit the shift gear to automatically move out of engagement with said direct drive means and into lower gear drive position; and manually operable means to throw said shift gear into position for reverse drive.

11. A transmission gear comprising elements for driving in high gear or lower gear, and including a shift gear functioning in both the high gear and lower gear positions of the gearing, a spring normally tending to throw said shift gear to a position for high speed drive and yieldable to undue resistance to permit the shift gear to automatically move into lower gear position; and manually operable means to hold said shift gear from automatically shifting.

12. A drive gear comprising a drive shaft and a driven shaft, a shift gear element on the driven shaft to slide thereon and to turn therewith, said driven shaft having a spirally disposed key with which the shift gear element is engaged, spring means tending to engage said shift gear with the drive shaft for direct drive, a counter-shaft, a gear element on the drive shaft, a gear element on the counter-shaft meshing with the element on the drive shaft, and a gear element on the counter-shaft and in constant mesh with the shift gear element.

CLAUDE BEARENS.